Aug. 18, 1959　　　W. S. HACKETT　　　2,899,726
APPARATUS FOR ASSEMBLING SHELL MOLDS
Filed July 24, 1953　　　　　　　　　　　　4 Sheets-Sheet 1

INVENTOR
William S. Hackett
BY
ATTORNEY

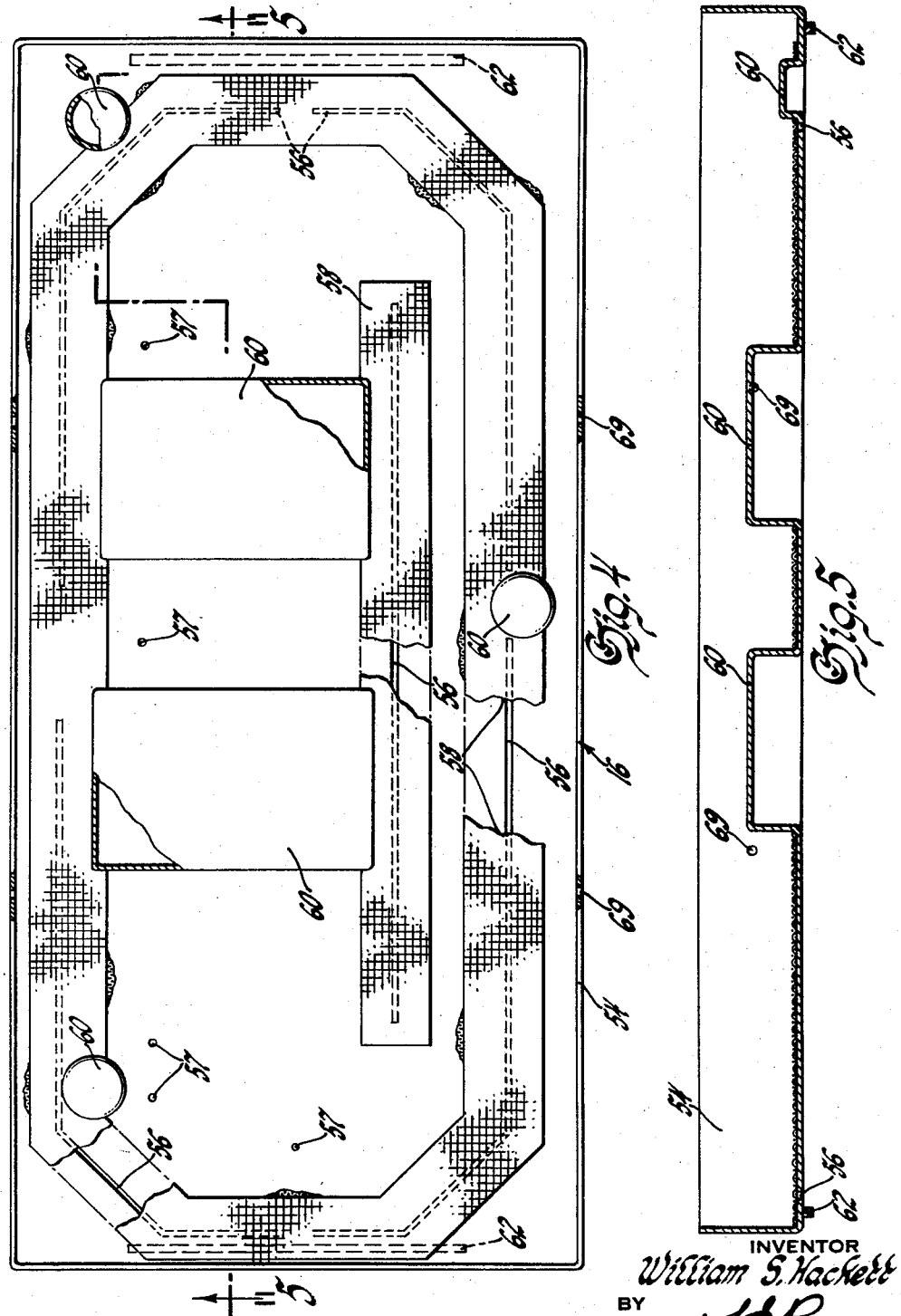

United States Patent Office 2,899,726
Patented Aug. 18, 1959

2,899,726
APPARATUS FOR ASSEMBLING SHELL MOLDS

William S. Hackett, Saginaw, Mich., assignor to General Motors Corporation, Detroit, Mich., a corporation of Delaware Application July 24, 1953, Serial No. 370,182

4 Claims. (Cl. 22—31)

This invention relates to the manufacture of shell molds and more particularly to an improved method and apparatus for the assembly of such molds.

Modern techniques in foundry practice employ shell molds and cores formed from mixtures of sand or other finely divided refractory type materials and plastic binders. The shell molding process consists essentially of using a heat-curable plastic or resin as a binder for sand or other finely divided refractory material to form thin-walled rigid molds having high gas permeability, good surface smoothness and dimensional stability. The molding material, generally a dry mixture of a major proportion of silica sand and a minor proportion of a plastic binder, is used in a powdered form with no water being added. Phenol formaldehyde and melamine formaldehyde resins are typical examples of thermosetting resin binders which can be used. The sand or other refractory material preferably is free of metal oxides, clay, moisture, and organic matter.

Shell mold sections are prepared by allowing the dry mixture of refractory material and binder to contact a hot metal pattern for a short period of time. A layer of the mixture adheres to the hot pattern surface because of the heating of the plastic binder thereby. As a result, the molten binder entraps the refractory particles with which it is intimately mixed and flows to accurately reproduce pattern details. Metal patterns must be employed because they are subjected to elevated temperatures. Pattern temperatures within the range of about 250° F. to 350° F. are typical, but pattern temperatures up to 800° F. may be advantageously employed under particular conditions. The half patterns, gate and runner, are usually permanently fixed on metal plates. The pattern temperature and the length of time the molding material is allowed to remain in contact with the hot pattern surface determines the resulting thickness of the shell mold. Mold build-up times ranging from a few seconds to approximately one minute are appropriate for various applications.

After this short mold build-up interval, the excess dry refractory material and binder are removed and the closely adhering layer of refractory material and plastic binder preferably is then cured by heating in a recirculating air oven which is maintained at a temperature within the range of approximately 300° F. to 1500° F. for a short period of time, usually from a few seconds to about 5 minutes, while still in contact with the metal pattern. This baking or curing operation converts the resinous material into a hard heat-resistant binder. After the removal of the metal pattern and the formed mold section from the cured oven, the shell mold section is stripped from the pattern.

Shell molds as used in metal pouring operations comprise two or more mold sections assembled in proper relationship to provide the desired mold cavity therebetween. In prior shell molding operations certain difficulties have been encountered in the assembly of shell mold sections or mold halves to form a shell mold. Typical prior shell mold assembly procedure has been to maintain shell mold sections in proper relationship for metal casting operations by providing a mold backing or bedding material such as steel shot or the like to surround the mold assembly and thereby prevent movement of the mold sections during metal pouring. However, not only have such prior methods failed in many instances to provide a clean, sharply defined casting but have in general been poorly adapted for mass production foundry operations because of the problems involved in handling the cumbersome mold backing material.

Accordingly, the principal object of this invention is to provide a method and apparatus for uniting shell mold sections to form a shell mold which can be used in metal pouring operations with little or no external support or backing. A still further object is the provision of an improved apparatus for uniting shell mold sections which permits the rapid assembly of strong shell molds. These and other objects and advantages of the invention will appear more fully from the description which follows.

The present invention contemplates assembly of a shell mold by applying a powdered heat-curable adhesive to portions of the shell mold section surfaces which are to be joined in the completed shell mold, and subsequently securing thereto a corresponding mold section by application of a uniform pressure until the adhesive is cured. Shell molds formed in accordance with the present invention not only exhibit high dimensional stability but can be assembled readily in production foundry operations thereby eliminating one of the most difficult problems heretofore encountered in the commercial adaptation of shell molding techniques. Since the mold sections are uniformly bonded around the mold cavity, the precision castings formed therein are almost completely devoid of fins. Moreover, the castings have a very smooth as-cast surface thereby considerably reducing the machining operations necessary for precision parts.

It will be understood that the term "mold" as used herein is applied in its generic sense to mean a casting form which includes both molds and cores, this invention in no manner being limited to the former. Similarly, unless otherwise indicated, the word "pattern" is used herein as including both mold patterns and core boxes.

The invention will be more fully understood taken in connection with the accompanying drawings illustrating a preferred embodiment of a shell mold assembly apparatus in accordance with the invention.

Fig. 4 is a view partially in section of an adhesive applicator in accordance with the present invention; and Fig. 5 is a view taken along the lines 5—5 of Fig. 4.

Figure 1:
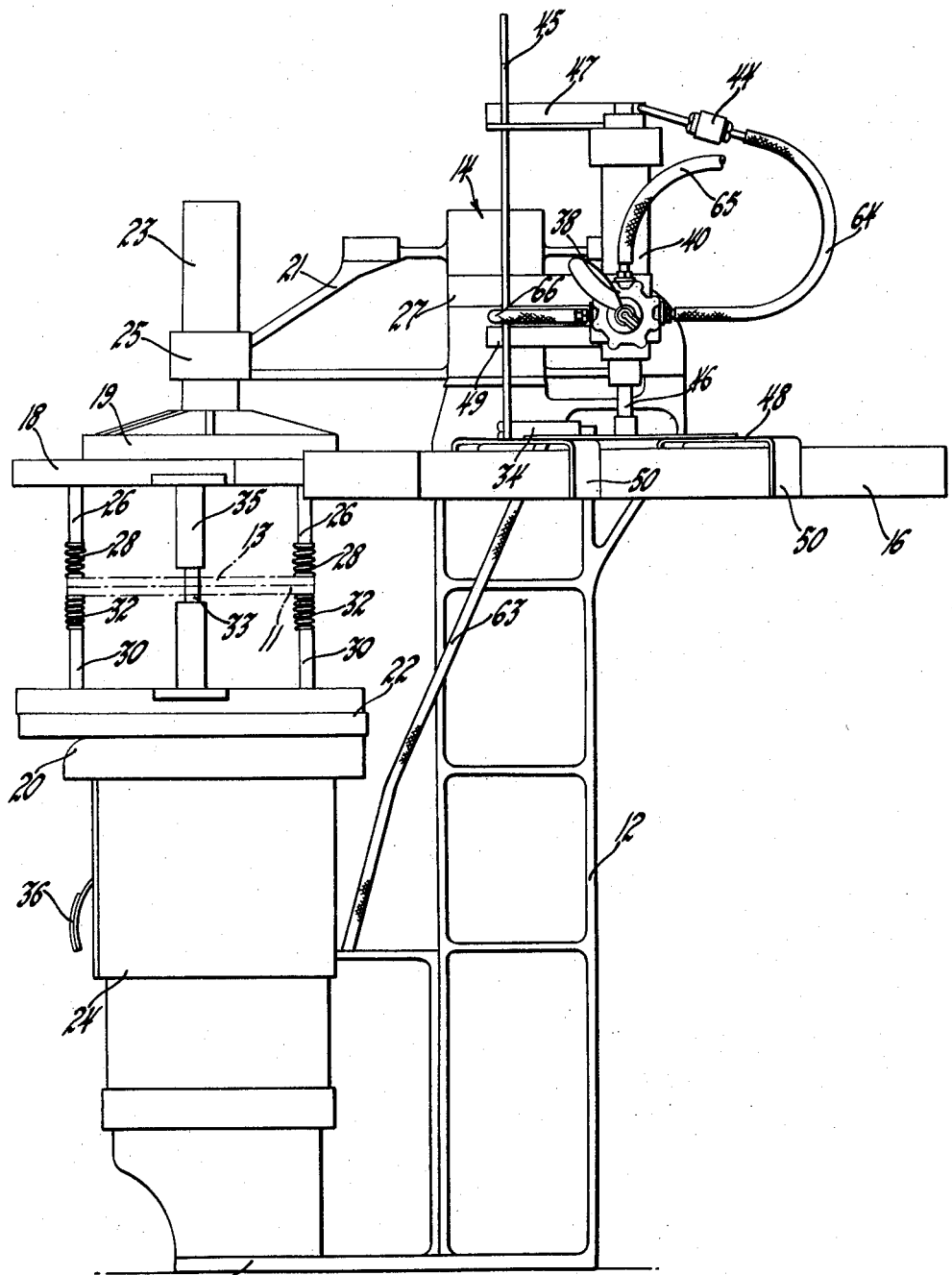
Fig. 1 is a somewhat schematic, elevational view of a shell mold assembly apparatus embodying the invention, illustrating one operating position thereof.

Referring more particularly to the drawings, in Fig. 1 is diagrammatically shown a shell mold assembly apparatus embodying the invention and including a base member 10. Mounted on the base 10 is a stationary frame 12 provided with an upstanding journal stud indicated generally at 14. This journal stud provides pivot means about which a shell mold adhesive applicator 16 and a shell mold clamping or squeeze fixture 18 can be turned, the pivotal movement being limited by pivot stops 29. The squeeze fixture 18 is secured to a platen 19 which in turn is positioned at the lower end of a shaft 23 adjustably mounted in a collar 25 at the end of pivot arm 21. The adhesive applicator 16 is mounted on the pivot arm 21 by means of an outwardly extending bracket 27. Also mounted on the base 10 is a mold support member 20 on which is positioned a second mold clamping or squeeze fixture 22. The mold support 20 is adapted for vertical movement and is operated by a compressed air cylinder 24 having conventional control means (not shown).

The mold clamping or squeeze fixtures 18 and 22 are adapted to apply a uniform pressure over the exterior surfaces of two shell mold sections 11 and 13 positioned in assembled relationship as shown schematically in Fig. 1. The clamping fixture 18 is provided with a plurality of mold contacting fingers 26, each of said fingers being provided with a spring 28 at the end thereof to provide resilient mold contacting means. Mold clamping fixture 22 is identical to the aforementioned clamping fixture 18, also having a multiplicity of mold supporting fingers 30 and spring contacts 32. Proper alignment of these mold squeeze fixtures in operation is provided by aligning pins 33 on the lower squeeze fixture 22 and corresponding aligning sockets 35 on the upper squeeze fixture 18.

Figure 2:
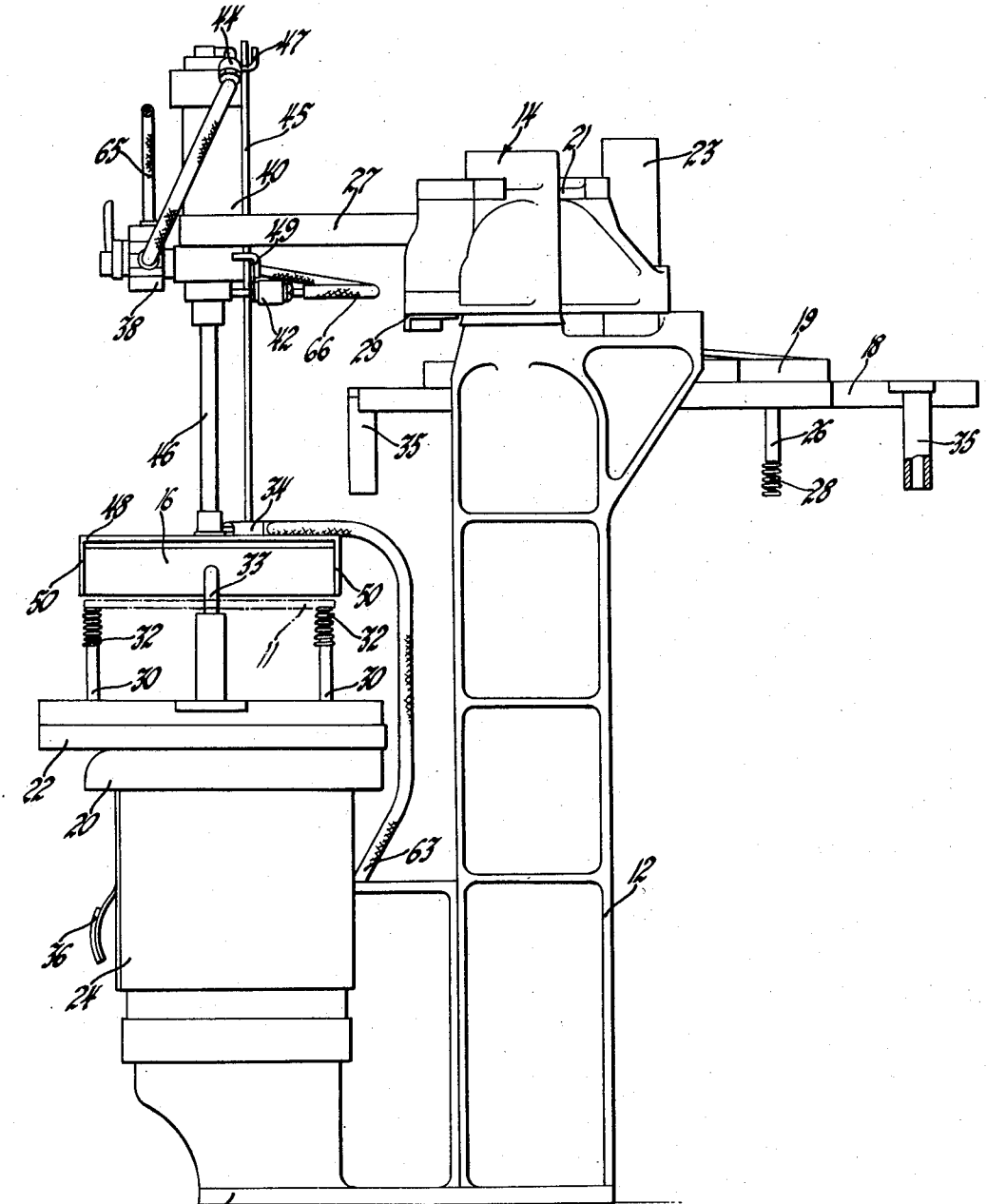
Fig. 2 is a view similar to Fig. 1 illustrating another operating position of the apparatus.

The operation of the apparatus generally is as follows: a shell mold section 11 is placed, mold cavity up, on the resilient supporting fingers 32 of the lower squeeze fixture 22 while the mold support 24 is in its lower position. For superior results, the shell mold section 11 should be at an elevated temperature, typically within the range of about 200° F. to 450° F. although 275° F. to 325° F. is a preferred range. Joining the mold sections at an elevated temperature permits the use of more heat resistant adhesives such as powered phenol formaldehyde or other heat-resistant binders as are used in the formation of the shell mold sections. In practice, it is preferred to assemble the heated shell mold sections directly from the curing oven thus utilizing the heat retained in the mold sections to facilitate curing of the adhesive. The adhesive applicator 16 is then rotated about the journal stud 14 into proper position over the shell mold section 11 and is lowered, by means of a compressed air cylinder 40, until the adhesive applicator contacts the shell mold section as indicated in Figure 2. While so positioned, a vibrator 34 is actuated through an air hose 63 by a valve 36 to deposit the desired amount of powdered adhesive in predetermined locations on the top surface of the shell mold section, the amount of adhesive deposited being determined by the length of time the vibrator is operated. The adhesive applicator 16 is then raised and rotated out of position.

Figure 3:
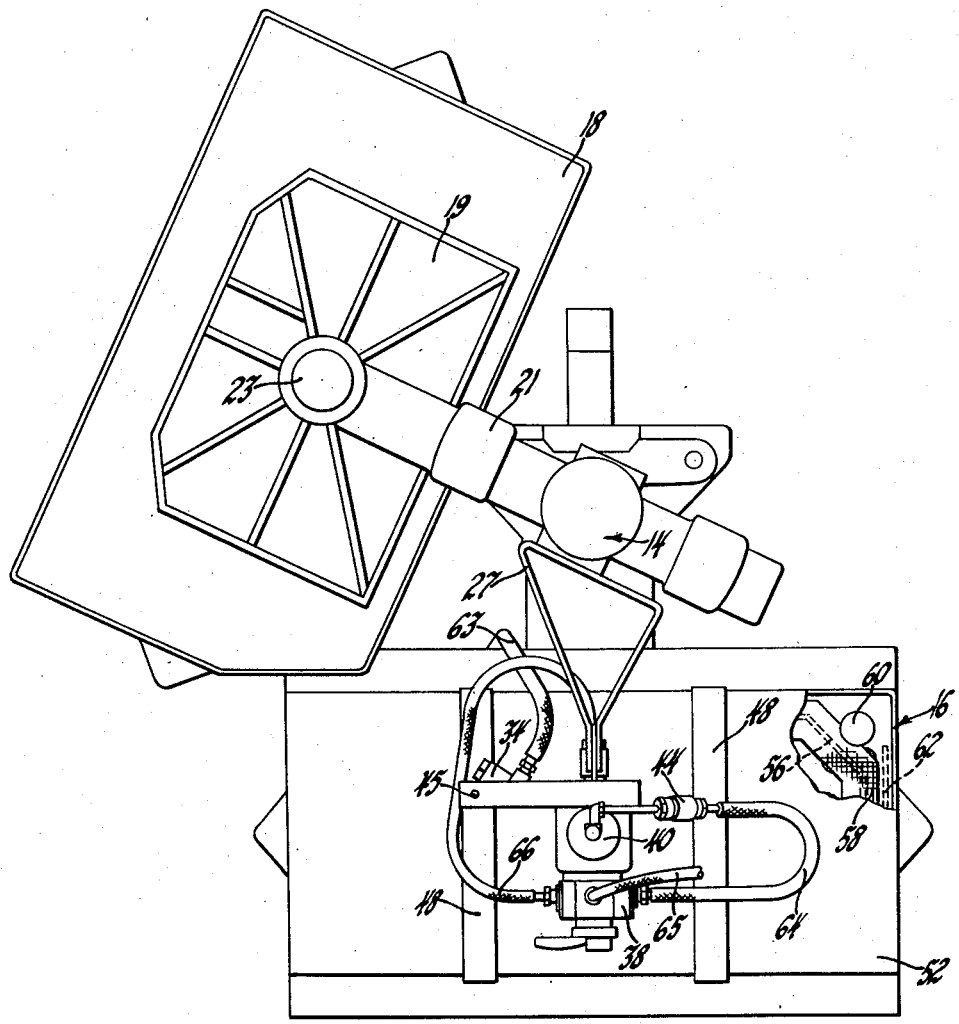
Fig. 3 is a top view of the apparatus shown in Figs. 1 and 2 illustrating the pivotal movement of portions of the apparatus.

As shown best in Fig. 3, the upper squeeze fixture 18 and the adhesive applicator 16 are adapted to pivot, preferably as a unit, in a horizontal plane about a vertical axis at the top of the frame 12. Hence, as the adhesive applicator 16 is pivoted out of position, the upper mold squeeze fixture 18 is brought into proper vertical alignment with the lower mold squeeze fixture 22. A second shell mold section 13 is then placed, mold cavity down, in proper alignment on the lower shell mold section. The lower mold support 20 is then raised, by means of a compressed air cylinder 24, to apply a uniform pressure through the mold contacting fingers 26 and 30 to opposite sides of the assembled shell mold sections 11 and 13 to facilitate curing of the powdered adhesive. After the adhesive is cured, the mold squeeze fixture is opened by releasing the pressure on the air cylinder 24 and the completed shell mold is removed.

Referring now to the adhesive applicator 16 and its operation in some detail, it will be seen from Figs. 1 and 2 that the vertical movement of the adhesive applicator 16 is regulated by a valve 38 adapted to actuate a piston 46 which in turn is operated by a compressed air cylinder 40. The rate of ascent and descent of the adhesive applicator 16 is regulated through air hoses 64, 65 and 66 by control valves 42 and 44, each of which is separately adjustable. The adhesive applicator is maintained in proper alignment during its ascent and descent by a guide bar 45 passing through guide brackets 47 and 49. Secured to the lower end of piston 46 is a clamping frame 48 having arms 50 which fit around the adhesive applicator 16 and are detachably secured thereto, typically by bolts extending through wall openings 69.

In operation, a quantity of powdered adhesive is placed in the adhesive applicator and a cover 52 placed over the fixture. A preferred embodiment of an adhesive applicator in accordance with the invention is shown in some detail in Fig. 4 and includes a housing member 54, typically having a rectangular cross section. One wall of this housing member is provided with cutout portions 56 through which powdered adhesive is deposited. The shape and location of these cutout portions are dictated by the particular application and are disposed so as to provide an optimum strength in the completed shell mold. A screen 58, serving to maintain the adhesive within the applicator until the vibrator 34 is actuated, is shown soldered over the cutout portions 56. Smaller openings such as those shown at 57 in Fig. 4 do not require such a screen. Because many irregularly shaped castings, for example, crankshafts, require specially designed offset type shell molds, it is necessary in some instances to provide raised sections in the adhesive applicator, as shown at 60 in Figs. 4 and 5, to accommodate the offset mold contours. As shown in Fig. 4 a thin strip 62 of a heat-resistant resilient material, typically a silicone rubber material, is secured against the surface of the adhesive applicator which would otherwise contact the shell mold surface.

It is to be understood that, although the invention has been described with specific reference to particular embodiments thereof, it is not to be so limited since changes and alterations therein may be made which are within the full intended scope of this invention as defined by the appended claims.

What is claimed is:

1. Apparatus for securing together mating halves of a shell mold, said halves having matching surfaces substantially surrounding the mold cavities and defining the parting line of the mold, said halves being secured together by a bond formed between said matching surfaces, said apparatus comprising a pair of horizontally disposed pressure plates mounted in vertically spaced relation, one of said plates being pivotally movable in the horizontal plane from a position in vertical registration with the other plate to a position laterally offset therefrom, each of said pressure plates having a plurality of post members extending vertically therefrom in opposed vertically spaced relationship at their outer ends in the registered position of the plates, adhesive discharge mechanism mounted adjacent said plates, said adhesive discharge mechanism and said lower plate being mounted for relative movement and arranged for vertical registration, said mechanism including a tray adapted to carry a powdered resin bonding agent and having a bottom perforated in a predetermined pattern above a mold half carried by the lower plate, said pattern providing perforations laterally offset from the cavity of the mold and vertically disposed above said matching surface of said mold, means for discharging powdered resin from said tray and through said perforations when said mold is registered therebeneath, and means for vertically moving one of said plates in the direction of the other to press together the halves of an assembled shell mold supported on said lower plate.

2. Apparatus for securing together mating halves of a shell mold, said halves having matching surfaces substantially surrounding the mold cavity and defining the parting line of the mold, said halves being adapted to be secured together by a bond formed between said matching surfaces, said apparatus comprising a pair of pressure plates mounted in spaced relation, one of said plates being movable from a position in registration with the other plate to a position offset therefrom, each of said pressure plates having a plurality of members extending generally normal thereto in opposed spaced relationship at their outer ends in the registered position of the plates, adhesive discharge mechanism mounted adjacent said plates, said adhesive discharge mechanism and one of said plates being mounted for relative movement and arranged for vertical registration, said mechanism including a tray adapted to carry a powdered adhesive and having a bottom perforated in a predetermined pattern for positioning above a mold half carried by one of said plates, said pattern providing perforations laterally offset from the cavity portion of said mold half when positioned thereover and vertically disposed above said matching surface of said mold half, means for discharging powdered adhesive from said tray and through said perforations onto said matching surface when said mold half is positioned therebeneath, and means for subsequently moving one of said plates in the direction of the other to press together the halves of an assembled shell mold supported on one of said plates and containing said adhesive between the matching surfaces thereof.

3. Apparatus for securing together mating halves of a shell mold, said halves having matching surfaces substantially surrounding the mold cavity and defining the parting line of the mold, said halves being adapted to be secured together by a bond formed between said matching surfaces, said apparatus comprising a pair of pressure plates mounted in spaced relation, one of said plates being movable from a position in registration with the other plate to a position offset therefrom, each of said pressure plates having a plurality of post members extending generally perpendicular thereto in opposed spaced relationship at their outer ends in the registered position of the plates, adhesive discharge mechanism mounted adjacent said plates, said adhesive discharge mechanism and one of said plates being mounted for relative movement and arranged for vertical registration, said mechanism including a tray adapted to carry a powdered resin bonding agent and having a bottom perforated in a predetermined pattern for positioning in a generally horizontal plane above a mold half carried by said plate, said pattern providing perforations laterally offset from a cavity portion of said mold half when positioned thereover and vertically disposed above said matching surface of said mold half, a vibrator operatively associated with said tray to initiate passage of said powdered resin through said perforations and onto said matching surface when said mold half is positioned therebeneath, and means for subsequently moving one of said plates in the direction of the other to press together the halves of an assembled shell mold supported on one of said plates and containing said resin bonding agent between the matching surfaces thereof.

4. Apparatus for securing together mating halves of a shell mold, said halves having matching surfaces substantially surrounding the mold cavity and defining the parting line of the mold, said halves being adapted to be secured together by a bond formed between said matching surfaces, said apparatus comprising a pair of pressure plates mounted in vertically spaced relation, one of said plates being movable from a generally horizontally disposed position in vertical registration with the other plate to a position laterally offset therefrom, each of said pressure plates having a plurality of spring members extending vertically therefrom in opposed vertically spaced relationship at their outer ends in the registered position of the plates, adhesive discharge mechanism mounted adjacent said plates, said adhesive discharge mechanism and the lower of said plates being mounted for relative movement and arranged for vertical registration, said mechanism including a tray adapted to carry a powdered resin bonding agent and having a bottom perforated in a predetermined pattern for positioning above a mold half carried by said lower plate, said pattern providing perforations laterally offset from the cavity portion of said mold half when positioned thereover and vertically disposed above said matching surface of said mold half, a vibrator connected to said tray to initiate passage of said powdered resin through said perforations and onto said matching surface when said mold half is positioned therebeneath, and power means for subsequently moving one of said plates in the direction of the other to cause said spring members to resiliently engage opposite back surfaces of an assembled shell mold supported on said lower plate to thereby press and bond said mold halves together.

References Cited in the file of this patent
UNITED STATES PATENTS

| | | |
|---|---|---|
| 1,707,411 | Nicholls | Apr. 2, 1928 |
| 1,872,628 | Esch | Aug. 16, 1932 |
| 2,362,234 | Barger | Nov. 7, 1944 |
| 2,660,220 | Hawkins | Nov. 24, 1953 |
| 2,728,122 | McLeer | Dec. 27, 1955 |
| 2,736,936 | Gruenberg et al. | Mar. 6, 1956 |

OTHER REFERENCES

The Iron Age, June 26, 1952, pages 112–116.
Foundry, September 1952, pages 108–111.